Aug. 25, 1953   J. J. MILLER   2,649,872
PLANER ATTACHMENT FOR ROTARY SAWS
Filed Dec. 14, 1950   2 Sheets-Sheet 1

INVENTOR.
Joseph J. Miller
BY
*A. Schapp.*
ATTORNEY

Aug. 25, 1953    J. J. MILLER    2,649,872
PLANER ATTACHMENT FOR ROTARY SAWS
Filed Dec. 14, 1950    2 Sheets-Sheet 2

INVENTOR.
Joseph J. Miller
BY
A. Schapp.
ATTORNEY

Patented Aug. 25, 1953

2,649,872

UNITED STATES PATENT OFFICE 2,649,872

PLANER ATTACHMENT FOR ROTARY SAWS

Joseph J. Miller, San Francisco, Calif., assignor to Philip A. Sussman and Ellis H. Jacobs, both of San Francisco, Calif.

Application December 14, 1950, Serial No. 200,857

5 Claims. (Cl. 144—39.)

The present invention relates to improvements in a planer attachment for rotary saw and its principal object is to provide a machine of the character described in which stock passing through the machine is successively planed and sawed in one continuous operation.

It is further proposed to provide the planer mechanism in the form of a removable attachment which may be raised and lowered at will to make the planer adaptable for different thicknesses of stock.

More particularly it is proposed to provide an improvement in the rotary saw described in my Patent No. 2,589,624, granted March 18, 1952, the improvement consisting in the provision of a planer attachment, and in the reorganization of the rotary saw structure in such a manner as to make the planer attachment fit into the whole assembly while being capable of independent adjustment.

In the original rotary saw I provided a main frame, a main shaft carrying one or more saw blades, tables on opposite sides of the saw, feed rollers on opposite sides of the saw blades and between the latter and the tables, and a pair of tension rollers cooperating with the feed rollers in advancing the stock, with various features of adjustment particularly with respect to the tension rollers.

In the present invention it is proposed to add a planer attachment to the rotary saw and to reorganize the original saw structure in such a manner as to bring the attachment into the organization to form a well-balanced unitary structure, with three sets of feed and tension rollers, one of the sets interposed between the planer and the saw, and the other sets on opposite sides of the planer and the saw, and with suitable adjusting means as will be set forth hereinafter.

Further objects and advantages of my invention will appear as the specification proceeds, and the novel features of my invention will be fully defined in the claims attached hereto.

Figure 1:
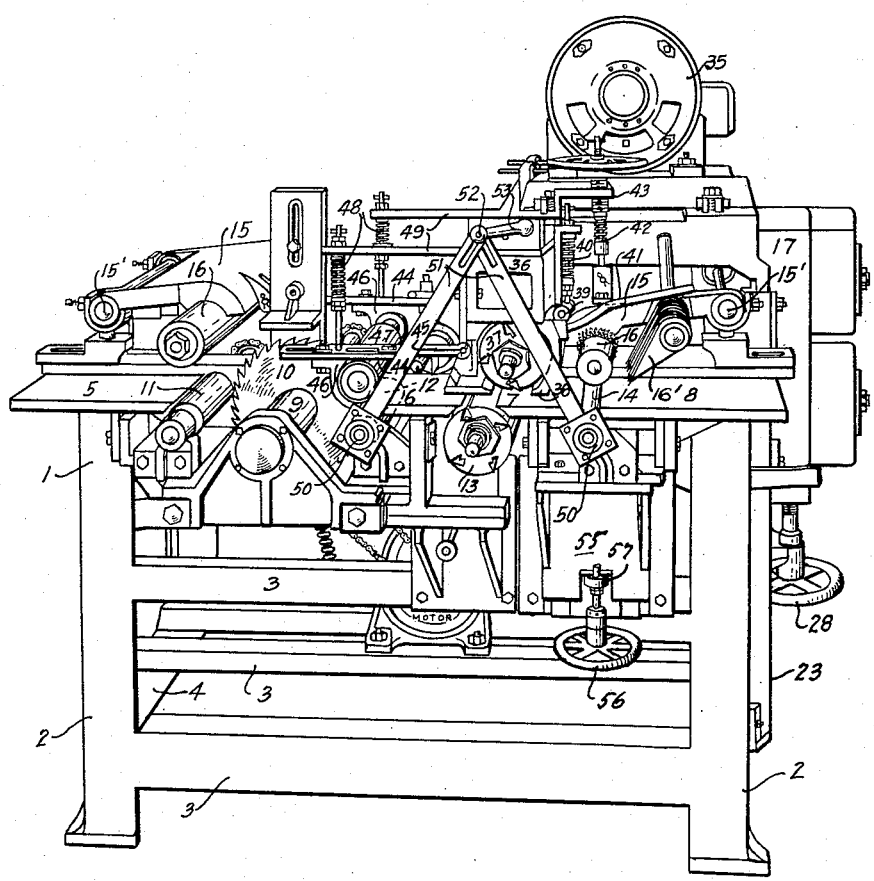
Figure 2:
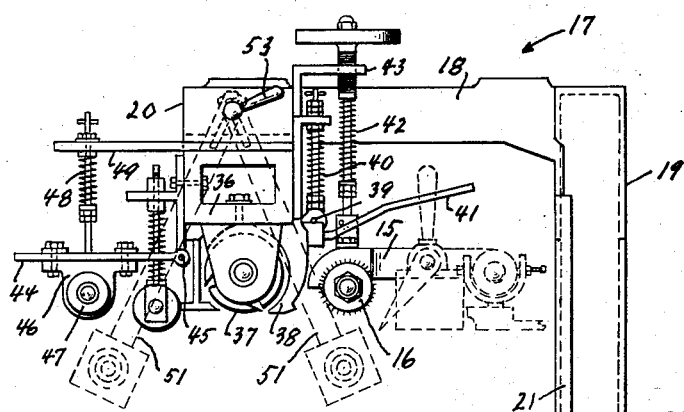
Figure 4A:
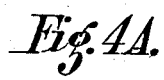
Figure 3:
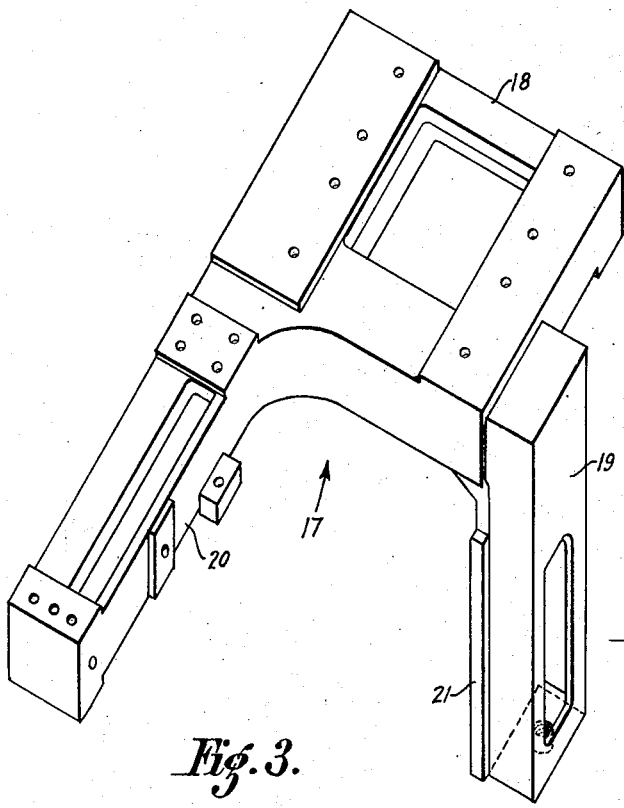
Figures 4, 5:
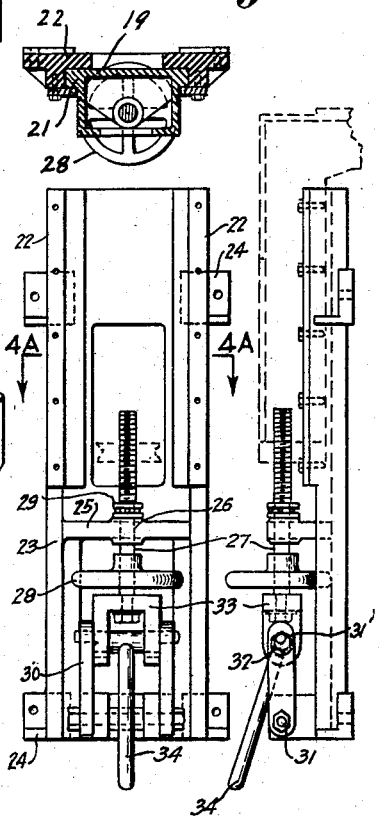

The preferred form of my invention is illustrated in the accompanying drawings, in which Figure 1 shows a perspective view of the entire machine, Figure 2, a front view of the planer attachment, Figure 3, a perspective view of the frame of the planer attachment, Figure 4, an end view of the planer attachment, Figure 4A, a section taken along line 4A—4A of Figure 4, and Figure 5, a rear view of a fragmentary portion of the planer attachment shown in Figure 4.

While I have shown only the preferred form of my invention, I wish to have it understood that various changes and modifications may be made within the scope of the claims attached hereto without departing from the spirit of the invention.

Referring to the drawings in detail, my machine comprises in its principal features a main frame 1, rectangular in form and supported on four legs 2, with suitable longitudinal spacing members indicated at 3, and fore and aft spacing members shown at 4.

The forward portion of the frame carries, on suitable brackets, as shown, four horizontally alined table sections 5, 6, 7 and 8, respectively, the table sections 5 and 6 being spaced sufficiently to accommodate between the same the main shaft 9 for the saw blades 10 and two feed rollers 11 and 12 on opposite sides of the saw blades, the feed rollers being mounted with their upper faces substantially in the plane of the table top.

The table sections 6 and 7 have a rotary planer 13 accommodated between the same and the table sections 7 and 8 have another feed roller 14 therebetween.

The two opposite ends of the main frame have two swinging frames 15 pivoted thereon as at 15′, the swinging frames extending inwardly and carrying, at their inner ends, tension rollers 16 adapted for cooperation with the feed rollers 11 and 14 respectively in advancing stock through the machine. One of the swinging frames may also be provided with suitable conventional dogs 16′ preventing the stock from kicking back.

All of the foregoing parts have been described rather sketchily since they substantially correspond to the corresponding parts of the pending application, except that the frame of the present application has been widened to accommodate the two additional table sections 6 and 7 and the rotary planer 13 between the same.

The present invention is directed principally to the combination with the structure previously described of the attachment shown in detail in Figures 2 to 5. This attachment comprises a second auxiliary frame 17 and various parts carried thereby, the frame including a horizontal body portion 18, a leg 19 projecting downwardly from an end edge thereof and an arm 20 projecting forwardly from the inner edge of the body portion.

The leg 19 is slidably mounted upon one end of the main frame, by means of two opposing flanges 21 riding in a pair of channels 22 forming part of a vertical frame 23 secured upon the end of the main frame by means of flanges 24. The vertical frame has a cross-member 25 with a hub section 26 adapted to slidably receive the shank 27 of a screw, the threaded end of which is threaded into the lower end of the leg 19, the screw having a head at its lower end as at 28 and being held against downward movement by a shoulder 29 resting on the hub 26. The leg 19 of the second frame may thus be raised by a turning movement of the screw in one direction and will come down of its own weight when the screw is turned in the opposite direction.

It will be noted that a short distance of shank is exposed between the hub 26 and the head 28 of the screw which allows the screw and the leg of the second frame to be raised quickly by mere upward pressure exerted on the head 28. Such pressure may be applied by any suitable cam action, as by a pair of links 30 having fixed pivots 31 and carrying a cross-pin 31' at their upper ends, the cross-pins having a pair of cams 32 bearing in corresponding holes in a yoke-shaped member 33, which latter bears against the bottom face of the screw head 28, so that when the cross-pin 31' is turned by means of a handle 34, the head 28 and the entire second frame are thrust upwardly for a quick release of parts carried thereby.

When the leg 19 of the second frame is properly positioned with respect to the main frame, the body portion 18 projects over the main frame at a height sufficient to clear the swinging frame 15, and the arm 20 projects forwardly over the main frame inside of the swinging frame. The body portion is intended to carry the motor 35.

The arm 20 has a bracket 36 secured upon the underface thereof and carries underneath this bracket, in bearings not shown, a rotary planer 37, mounted slightly in advance of the lower rotary planer 13 and made to plane the top surface of stock passing over the table.

A guard 38 is pivoted to the bracket as at 39 and is normally depressed into operative position with respect to the planer by means of a spring 40, but may be retracted from such position by means of a handle 41. A second spring 42 bearing against a fixed bracket 43 and on the swinging arm 15 causes the roller 16 carried by the latter to bear on the stock under tension.

The bracket 36 has a pair of straps 44 pivoted thereto as at 45, and these straps carry bearings 46 for a tension roller 47 mounted over and in cooperative relation to the feed roller 12, tension being applied to the roller 47 by means of two springs 48 bearing against fixed straps 49 projecting from the arm 20 of the second frame 17.

The outer ends of the two feed rollers 12 and 14 are supported in bearings 50 at the lower ends of two links 51, the upper ends of which are slotted to engage over a pin 52 projecting from the end of the arm 20 and to be secured thereon by means of a nut having a handle 53.

Any suitable drive means may be selected for driving the various elements. In the machine shown, the main shaft carrying the rotary saws is driven by means of a belt drive. The two planers are driven by independent motors, and the three feed rollers and tension rollers are suitably interconnected for a common drive from a single motor.

The two table sections 7 and 8 and the feed roller 14 are supported, through brackets as shown, by a plate 55 mounted with freedom of vertical adjustment by means of a hand wheel 56 having a threaded shank engaging in a nut 57 fixed with respect to the plate. The position of the table sections 7 and 8 determines the depth of the cut of the planer 13 into the bottom face of the stock passing through the machine.

I claim:

1. In a machine of the character described, a table having an end edge, a swingable frame pivoted above said end edge, a tension roller supported in the said frame above the table, and an auxiliary frame secured to the table at said end edge and having a rotary planer supported therein beyond the tension roller and in operative relation with respect to the table top for planing stock passing over the table and underneath the tension roller, the auxiliary frame having a raised body portion intermediate the table end and the planer to clear the swingable frame, and having spring actuated means supported by said raised body portion and bearing on the swingable frame for placing the roller under tension.

2. In a machine of the character described, a table having an end edge, a swingable frame pivoted above said end edge, a tension roller supported in the said frame above the table, and an auxiliary frame secured to the table at said end edge and having a rotary planer supported therein beyond the tension roller and in operative relation with respect to the table top for planing stock passing over the table and underneath the tension roller, the auxiliary frame having a raised body portion intermediate the table end and the planer to clear the swingable frame, and the table and the auxiliary frame having cooperating threaded means for raising and lowering the auxiliary frame.

3. In a machine of the character described, a table having an end edge, a swingable frame pivoted above said end edge, a tension roller supported in the said frame above the table, and an auxiliary frame secured to the table at said end edge and having a rotary planer supported therein beyond the tension roller and in operative relation with respect to the table top for planing stock passing over the table and underneath the tension roller, the auxiliary frame having a raised body portion intermediate the table end and the planer to clear the swingable frame, the table and the auxiliary frame having cooperative threaded means for raising and lowering the auxiliary frame, and the table and the threaded means having cooperative cam-operated means for effecting a quick raising of the auxiliary frame.

4. In a machine of the character described, a table having an end edge, a swingable frame pivoted above said end edge, a tension roller supported in the said frame above the table, and an auxiliary frame secured to the table at said end edge and having a rotary planer supported therein beyond the tension roller and in operative relation with respect to the table top for planing stock passing over the table and underneath the tension roller, the auxiliary frame having a raised body portion intermediate the table end and the planer to clear the swingable frame, and the auxiliary frame having straps hinged thereto with a tension roller supported in the straps beyond the planer.

5. In a machine of the character described, a table having an end edge, a swingable frame pivoted above said end edge, a tension roller supported in the said frame above the table, and an auxiliary frame secured to the table at said end edge and having a rotary planer supported therein beyond the tension roller and in operative relation with respect to the table top for planing stock passing over the table and underneath the tension roller, the auxiliary frame having a raised body portion intermediate the table end and the planer to clear the swingable frame, and the auxiliary frame having straps hinged thereto with a tension roller supported in the straps beyond the planar and having fixed straps supported over the hinged straps, with spring means interposed between the fixed straps and the hinged straps for applying pressure to the latter tension roller.

JOSEPH J. MILLER.

References Cited in the file of this patent

UNITED STATES PATENTS

| Number | Name | Date |
|---|---|---|
| 95,782 | Douglas | Oct. 12, 1869 |
| 273,817 | Chapman | Mar. 13, 1883 |
| 417,854 | Berry | Dec. 24, 1889 |
| 515,313 | Blaisdell | Feb. 20, 1894 |
| 569,288 | Lhote | Oct. 13, 1896 |
| 899,143 | Thomas et al | Sept. 22, 1908 |
| 1,203,226 | Matthew | Oct. 31, 1916 |
| 1,736,641 | Zimmerman | Nov. 19, 1929 |
| 1,802,096 | Tautz | Apr. 21, 1931 |
| 1,825,041 | Babare | Sept. 29, 1931 |